United States Patent [19]

Mallory et al.

[11] 4,137,061
[45] Jan. 30, 1979

[54] APPARATUS FOR FORMING GLASS CONTAINERS

[75] Inventors: James D. Mallory; Richard T. Kirkman, both of Maumee, Ohio

[73] Assignee: Owens-Illinois, Inc., Toledo, Ohio

[21] Appl. No.: 775,132

[22] Filed: Mar. 7, 1977

[51] Int. Cl.$^2$ .............................................. C03B 9/16
[52] U.S. Cl. ...................................... 65/232; 65/234; 65/241; 65/260
[58] Field of Search .................. 65/77, 81, 232, 234, 65/240, 241, 260, 357, 359

[56] References Cited

U.S. PATENT DOCUMENTS

| | | | |
|---|---|---|---|
| 1,385,428 | 7/1921 | Cox | 65/226 |
| 1,527,556 | 2/1925 | Kadow | 65/212 |
| 1,680,544 | 8/1928 | Ingle | 65/76 |
| 1,826,019 | 10/1931 | Peiler | 65/77 |
| 1,840,532 | 1/1932 | Rowe | 65/232 X |
| 1,843,159 | 2/1932 | Ingle | 65/75 |
| 1,843,160 | 2/1932 | Ingle | 65/75 |
| 1,843,285 | 2/1932 | Ingle | 214/147 T |
| 1,902,140 | 3/1933 | Rowe | 65/75 |
| 1,911,119 | 5/1933 | Ingle | 65/219 |
| 2,142,954 | 1/1939 | Rowe | 65/76 |
| 2,151,876 | 3/1939 | Wadman | 65/230 |
| 2,273,777 | 2/1942 | Berthold | 65/221 X |
| 2,402,234 | 2/1946 | Berthold | 65/76 |
| 2,648,168 | 8/1953 | Rowe | 65/76 |
| 3,171,728 | 3/1965 | Andersen | 65/234 |
| 3,216,813 | 11/1965 | Mumford | 65/234 X |
| 3,251,673 | 5/1966 | Brymer, Jr. | 65/359 |
| 3,281,230 | 10/1966 | Lyon et al. | 65/261 |
| 3,305,344 | 2/1967 | Colchagoff | 65/357 |
| 3,445,218 | 5/1969 | Trudeau | 65/235 |

*Primary Examiner*—Arthur D. Kellogg
*Attorney, Agent, or Firm*—D. T. Innis; Myron E. Click; David H. Wilson

[57] ABSTRACT

Apparatus for forming glass containers by the blow and blow process in which a parison mold having a plurality of cavities is centrally positioned relative to a pair of blow molds having a plurality of cavities. The parisons are formed with their necks down in the parison mold from a charge of glass delivered to each cavity. Vacuum is applied to the neck area of the mold to form the finish portion of the container. A neck pin is pulled and air under pressure is fed to the interior of the area from which the neck pin is drawn to expand the glass within the parison mold at a continuous rate until the glass within the parison mold comes in contact with a baffle which closes the upper end of the parison mold. The parison mold is then opened and the parisons are transferred alternately from the parison mold to the blow molds where they are expanded into final shape. During the transfer of the parisons from the parison mold to the blow mold, air under pressure is maintained within the hollow interior of the parison. The parison transfer mechanism carries the neck molds with parison counterblow pressure delivering means as well as puff or low pressure means for either puffing the parison during its invert movement from the parison mold to the upright position at the blow mold or to help sustain the parison against collapse during invert. The ability to apply puffing air to the parison during transfer is a significant step in the forming process.

15 Claims, 21 Drawing Figures

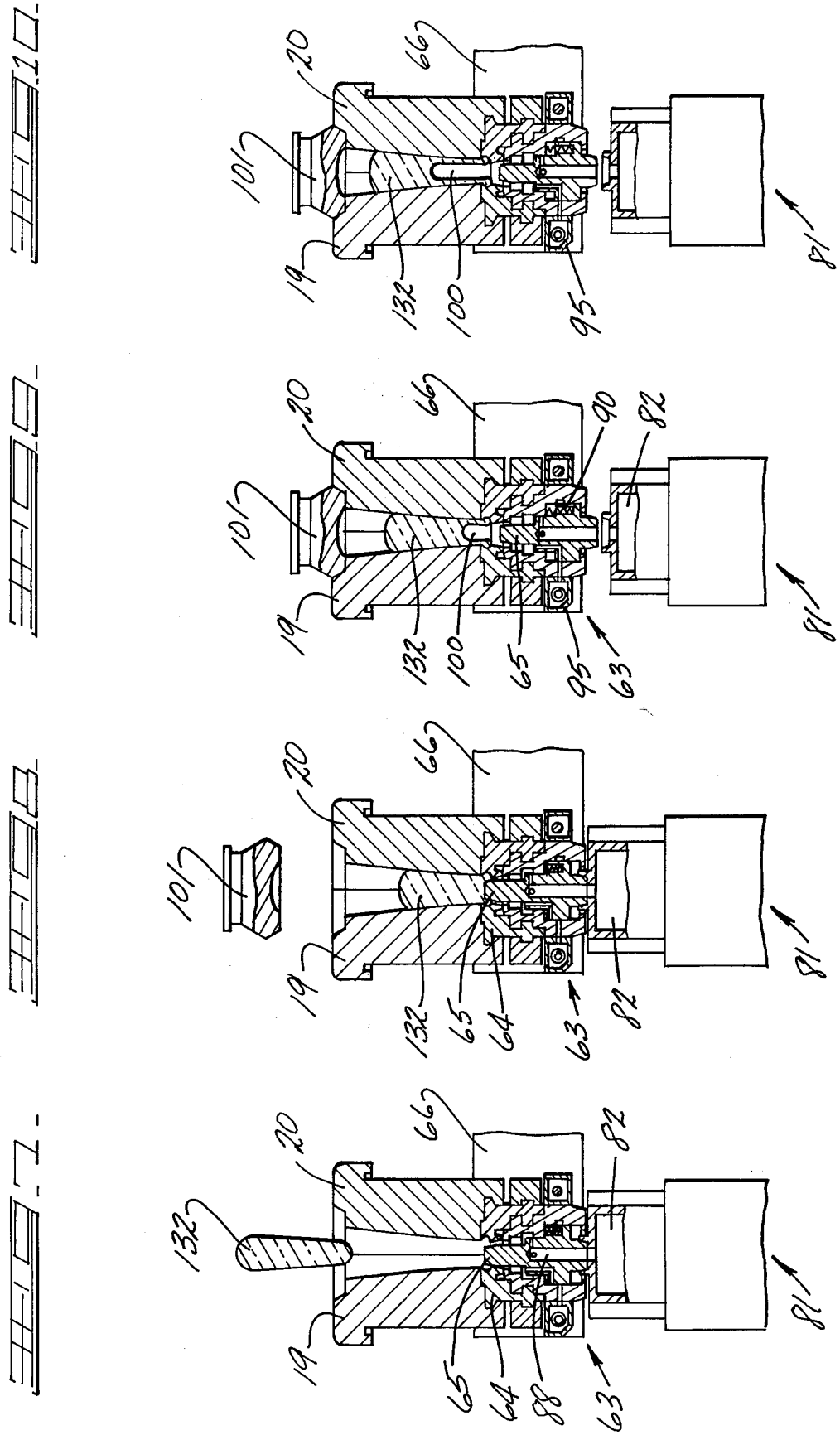

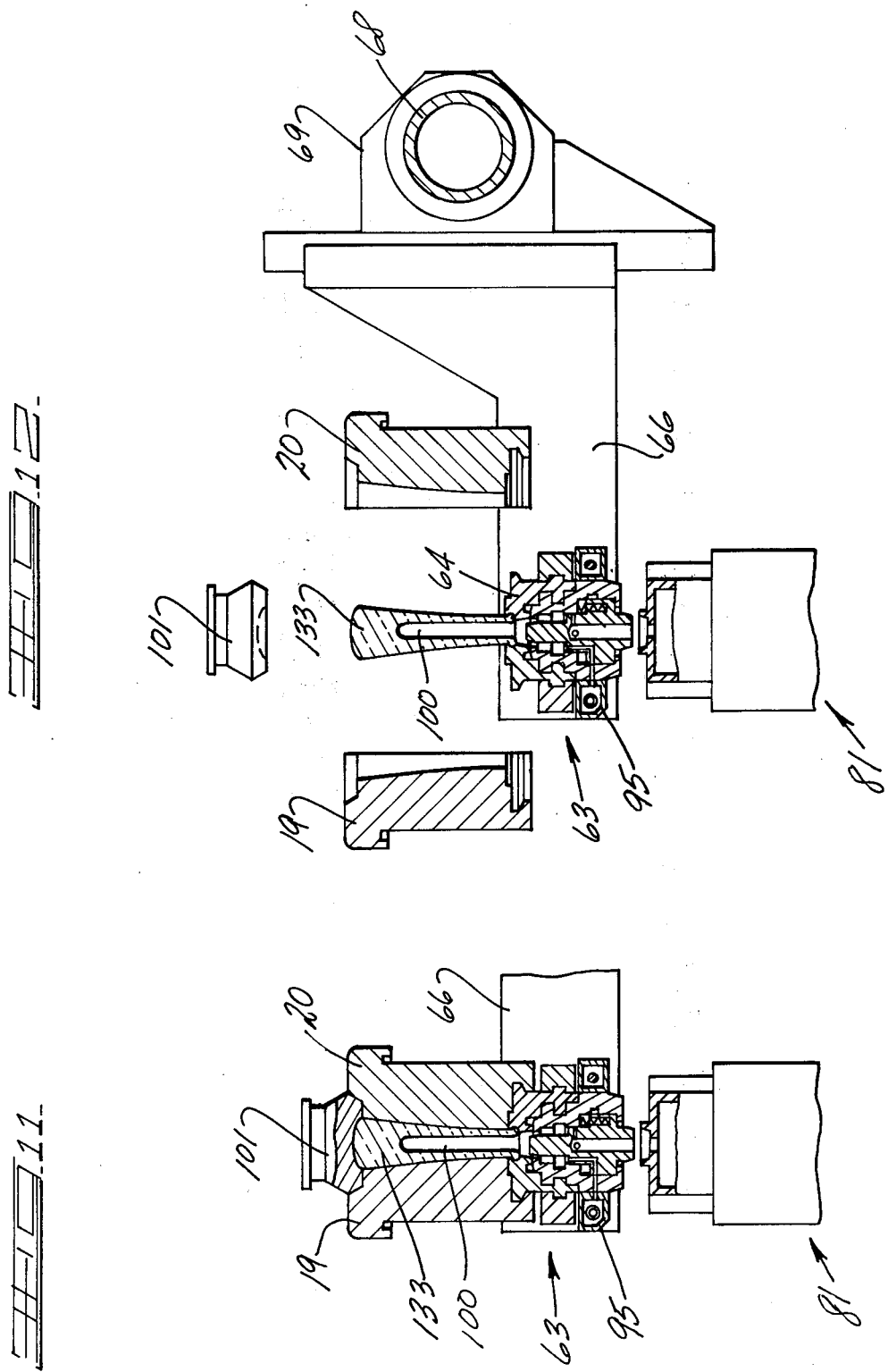

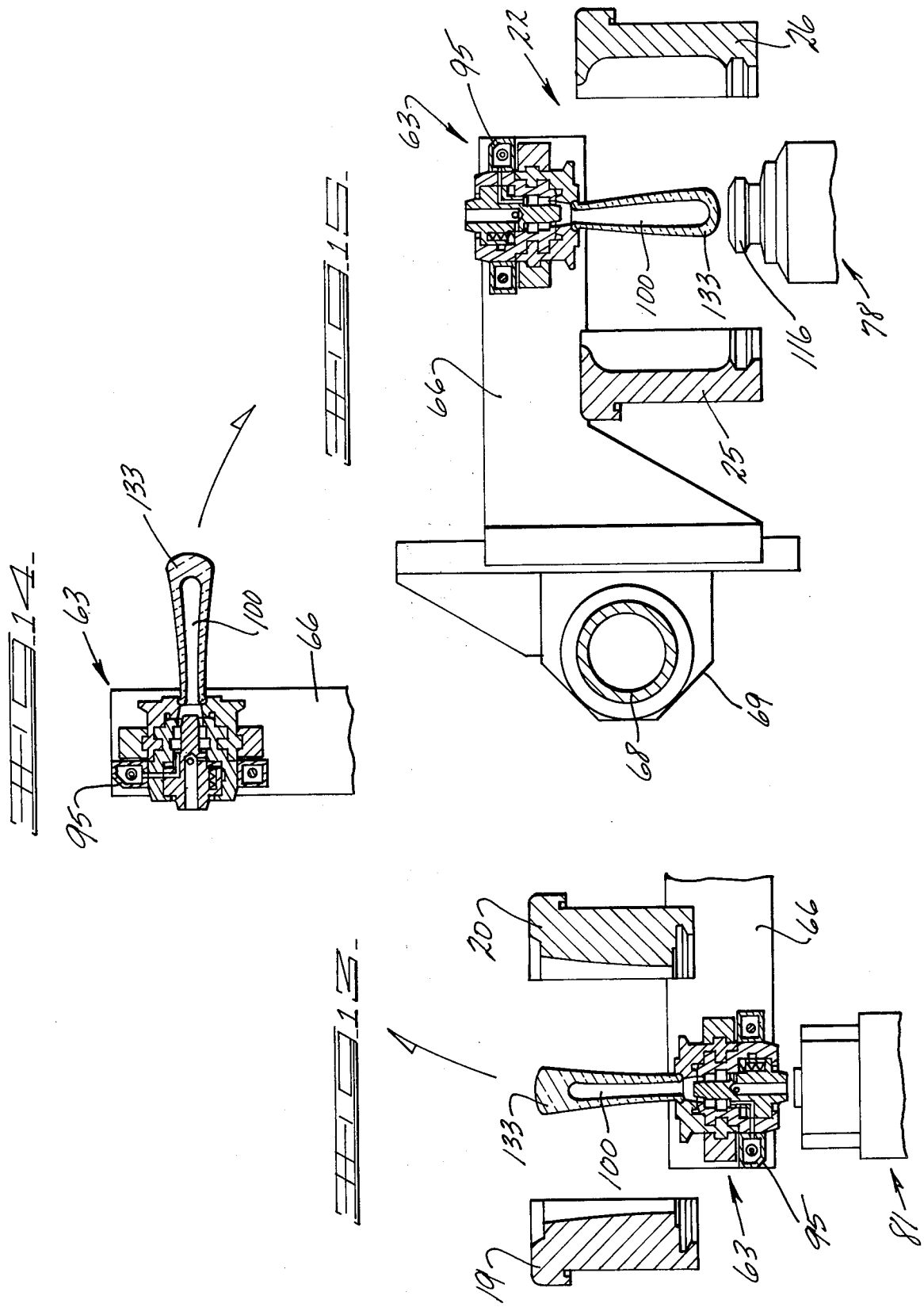

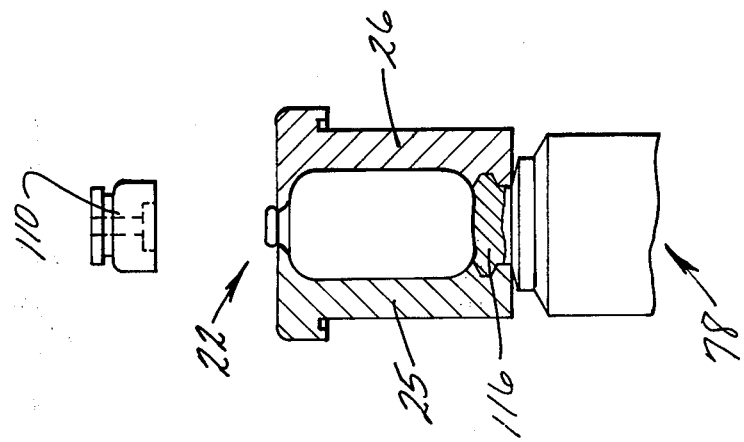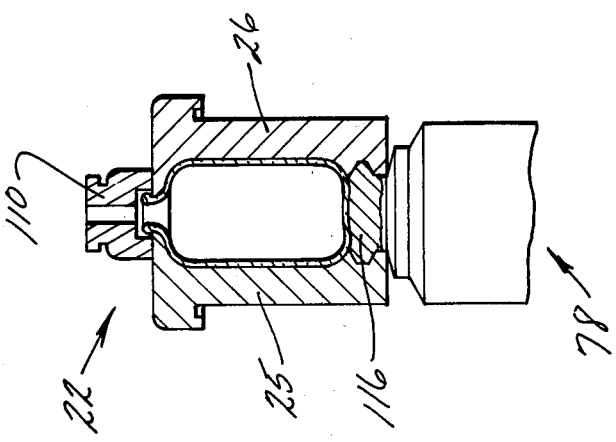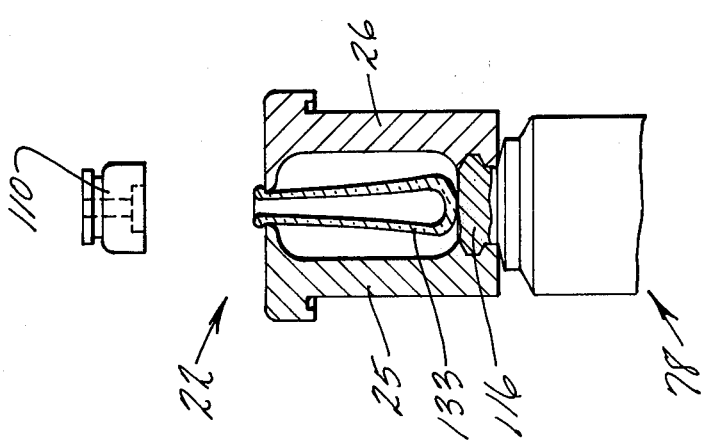

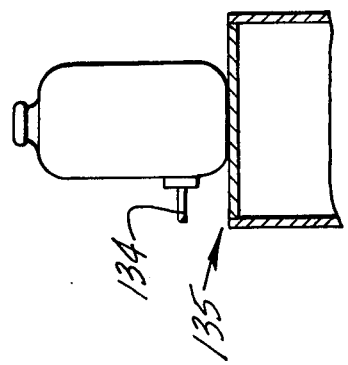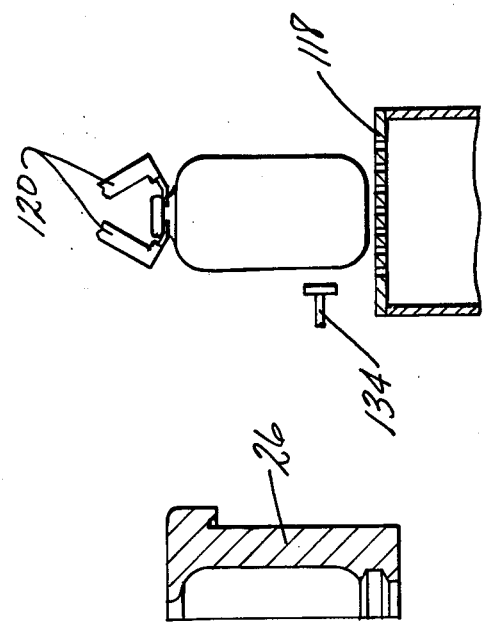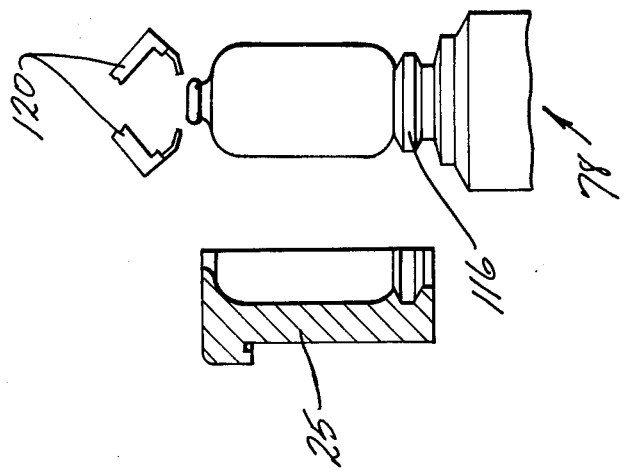

APPARATUS FOR FORMING GLASS CONTAINERS

BACKGROUND OF THE INVENTION

This invention relates to the manufacture of blown glass articles such as bottles, jars, flasks, etc. According to the "narrow neck" or "blow and blow" method presently used and as described in U.S. Pat. No. 1,911,119, a charge of glass is delivered to and compacted or caused to settle in the cavity of an inverted or neck-down blank or parison mold, the glass of the charge extending from the neck portion of the mold cavity part of the way up the sides thereof. A baffle plate is placed on the uppermost end of the inverted blank or parison mold and air under pressure is applied to the interior of the glass in the mold to counterblow such glass into conformity with the internal configuration of the blank or parison mold and against the baffle plate. Thereafter, the counterblown blank or parison is transferred to an upright final blow mold in which the blank or parison is disposed in an upright or neckup position and air under pressure is applied to the interior thereof. The counterblown blank or parison is thus expanded to the configuration of the final blow mold cavity, thereby forming an article of the final shape and size desired.

This method of forming articles of glassware has been practiced since the 1920's. Certain faults and shortcomings have been known and such defects as "settle waves" in the sidewalls of the article, marking the juncture of wall portions of two different thicknesses are common. Other common defects are baffle marks and shear scars in the bottom of the article. Furthermore, articles of generally circular cross-sectional configuration have experienced the formation of excessively thick bottoms and relatively thin shoulders when produced by the above-described method. Those articles which would have a generally rectangular cross-sectional configuration or are of a flask shape usually have excessively thick sides or panels and relatively thin shoulders. As a matter of fact, different portions of practically all articles produced by the aforementioned method vary substantially in the thickness of the walls thereof. Therefore, for most articles of a given size and intended use, it has been necessary to use a glass charge of undue size and weight so as to insure that the article produced will be thick and strong enough at its thinnest wall to enable the article to withstand the normal abuse during the service for which the article is intended. The temperature of the glass from which the article is formed is lower than would be equally suitable if the charge were substantially smaller.

An attempt to avoid some of the problems discussed above would appear to have formed the basis for U.S. Pat. No. 1,840,532 dated Jan. 12, 1932, issued to G. E. Rowe. The general teaching of this patent was, in effect, that if the making of a bottle could be accomplished without forming a parison in a parison mold, then a lighter weight bottle could be produced. Whether this patent or the invention set forth therein ever became commercially significant or was ever actually practiced is not known to applicants. It is clear that the previously mentioned U.S. Pat. No. 1,911,119, issued to the same assignee, has become the forerunner of the presently successful and commercially important standard "I.S." glass forming machine. Thus it would appear that the invention in U.S. Pat. No. 1,840,532 did not prove to be successful or was incapable of being commercialized. One complicating factor that was involved, in the process of Rowe, was the rotation of the charge of glass about the central axis of the neck mold, in order to attain some semblance of even distribution of the glass about the bubble that was being blown or formed therein. This would appear to be a closer approach to the hand-blowing techniques where the charge was rotated by the glass blower on the end of a punty while being expanded.

Some of the shortcomings and faults mentioned above are eliminated or their effect is minimized by the present invention which, it will be seen from the detailed description to follow, is capable of performing some of the steps of the well-known, commonly practiced, "blow and blow" process of forming glassware, but will differ therefrom in important particulars.

It has been known that hand-blowing techniques for forming hollow objects from glass have been capable of producing thin walled articles having fairly uniform wall thickness. The hand-blowing technique, however, requires considerable skill and experience and in this day is a relatively unique talent not possessed by many glass producers and certainly would not be an economically feasible method of producing glass containers of the are that the presently made by machines in large volume.

SUMMARY OF THE INVENTION

Apparatus for forming glass containers by the blow and blow process, wherein a gob of glass is delivered to a parison and neck mold cavity and the gob is settled in the neck mold by vacuum. After the vacuum settle has been completed, air under pressure is used to softly counterblow in the parison mold to thereby form a parison and upon complete counterblow of the parison, the parison is inverted and transferred from the parison mold by manipulation of the neck molds to a final or blow mold where the parison is expanded into final form. The apparatus permits superatmospheric pressure being maintained within the interior of the formed parison during the transfer and inversion thereof, with the pressure within the parison being released after transfer to the blow mold is completed, resulting in a glass container of a given volumetric capacity being formed with less glass and of a more uniform wall thickness and improved strength.

BRIEF DESCRIPTION OF THE DRAWINGS

FIGS. 7"21 7-are diagrammatic views illustrating the parison and bottle forming process carried out by the apparatus with a single article formation illustrated.

DETAILED DESCRIPTION OF THE DRAWINGS

Figure 1:
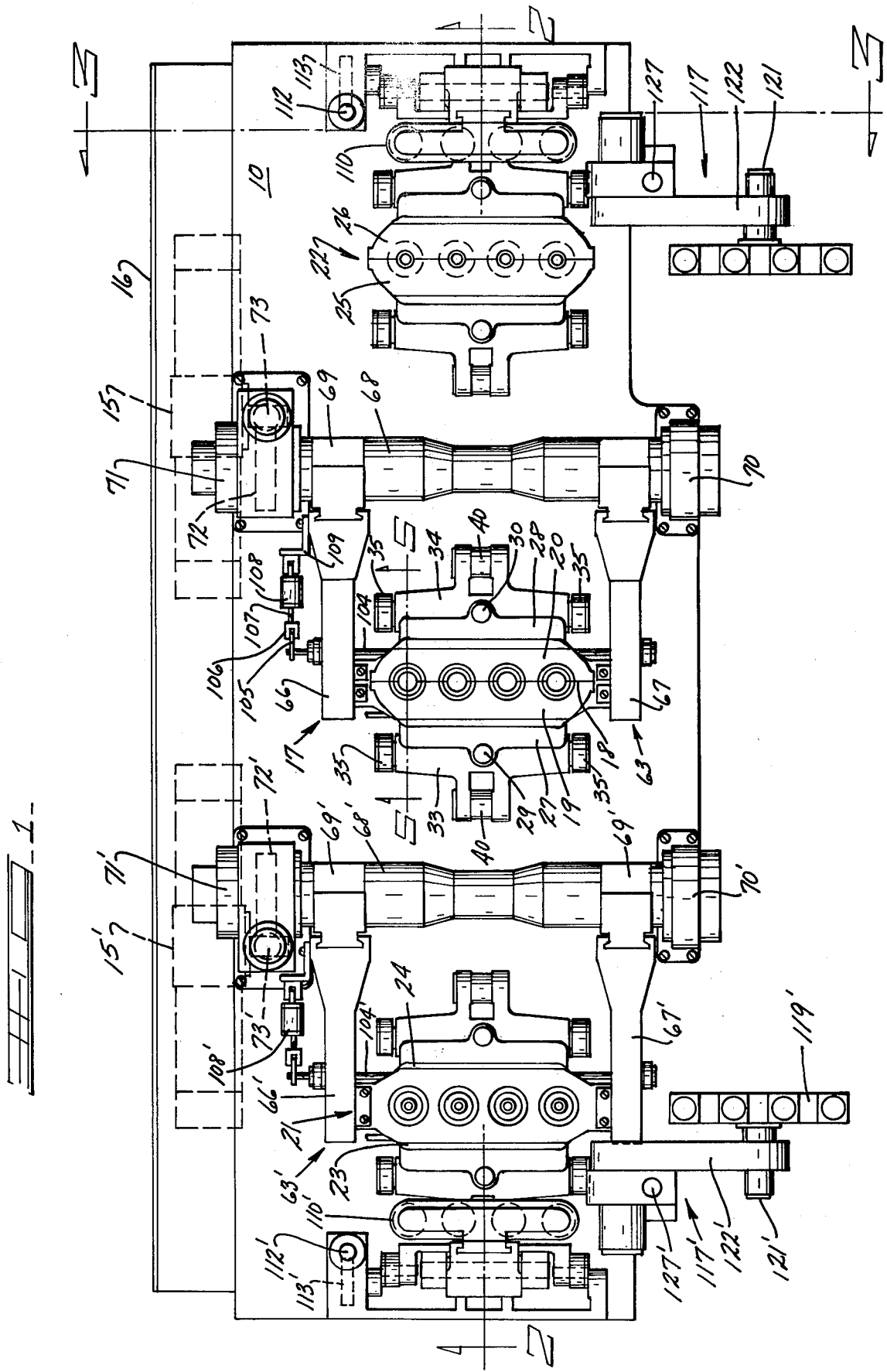
FIG. 1 is a top plan view of a glass forming machine for carrying out the present invention.

The apparatus illustrated in the accompanying drawings, when operated in its intended manner will perform the process of the invention to produce articles of glassware such as bottles and jars which will have very uniform radial glass wall distribution. The improved radial distribution permits substantial reduction in glass weight without loss in container strength.

Because in the past the counterblow of the parison was carried out with air pressure sufficient to accomplish the delayed counterblow in a relatively short period of time and the glass was blown against the mold walls and the baffle with considerable force, a significant amount of heat was conductively removed by the contact of the glass with the mold walls and baffle. This resulted in the development of a fairly thick, viscous, chilled surface or, as is termed in the art, an enamel or skin that would provide a degree of stiffness to the parison. This permitted the parison to be unsupported, in an inverted position, when the parison mold and baffle were removed from contact with the parison. The parison could then be inverted by the transfer means carrying the parison to the blow mold. Obviously, if the skin or enamel of the parison is relatively thick, the reheat period necessary to permit the heat within the parison to remelt or resoften the skin of the parison must be relatively long. The length of time for completed reheat will slow up the blowing process at the blow station. The reheat must be completed, otherwise the parison cannot be expanded in the blow mold with any hope of having relatively even wall thickness distribution. With poor distribution, the container will be only capable of withstanding pressures or abuses that the thinnest section can handle.

With the foregoing in view, the apparatus of the invention will perform a process which has several distinct advantages over the present forming process in that processes hotter (25°–100° F.) glass gob of reduced weight may be used. The hotter gob is delivered to a mold and immediately set in the finish mold by vacuum. The time of contact with the mold wall is minimal and the forces involved are that of gravity except in the neck forming zone. The counterblow is begun immediately without requiring any significant corkage reheat period because of the elevated glass temperature and short plunger-glass contact time. The total mold contact time of the glass in the parison mold may be 1.6 seconds compared to 2.1 seconds on the standard "I.S.". The counterblow pressure is kept at a low level (of about 1 to 10 psi. internally of the parison, as compared to a conventional pressure of about 30 psi.) so as to create what may be termed a "soft" counterblow. The term "soft," while being synonymous with low pressure, also has another significant connotation, in that the glass parison is expanded to the extent that the mold walls and baffle permit but the glass only very lightly contacts these surfaces. In other words, the counterblow never results in any substantial force with regard to the contact of the parison with the parison mold. This procedure has the advantage that the heat removal from the parison through conduction is reduced. This results in the parison being without a thick skin or enamel of chilled glass. When this parison is to be transferred from the open parison mold to the blow mold, it requires support of a sort, and in the present process takes the form of air trapped within the parison that is above atmospheric in pressure. The extent of the pressure of the entrapped air will depend on the degree of stiffness required to support the parison during invert and transfer. It may even be desirable to inject a "puff" of air under pressure to the interior of the parison to render the parison stiffer or to effect an actual expansion of the parison during transfer.

It has also been determined that one advantage of using hotter gobs and maintaining the parison wall temperature somewhat elevated above that currently being practiced is that the surface of the article being produced, will have less sodium ions after forming and this should result in a glass article having a greater resistance to abrasion and improved strength characteristics.

Figure 2:
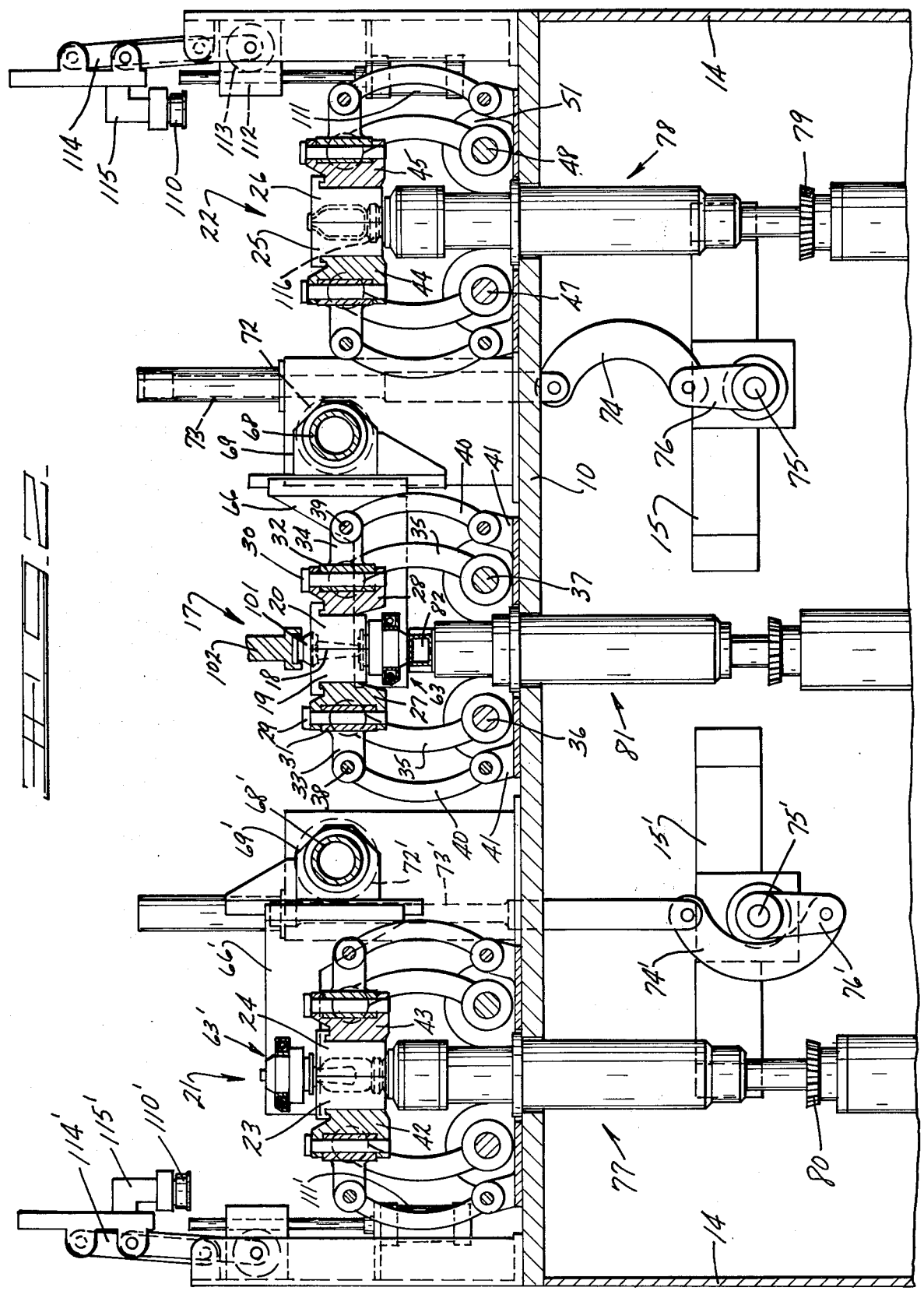
FIG. 2 is a cross-sectional view taken at line 2—2 of FIG. 1.
Figure 3:
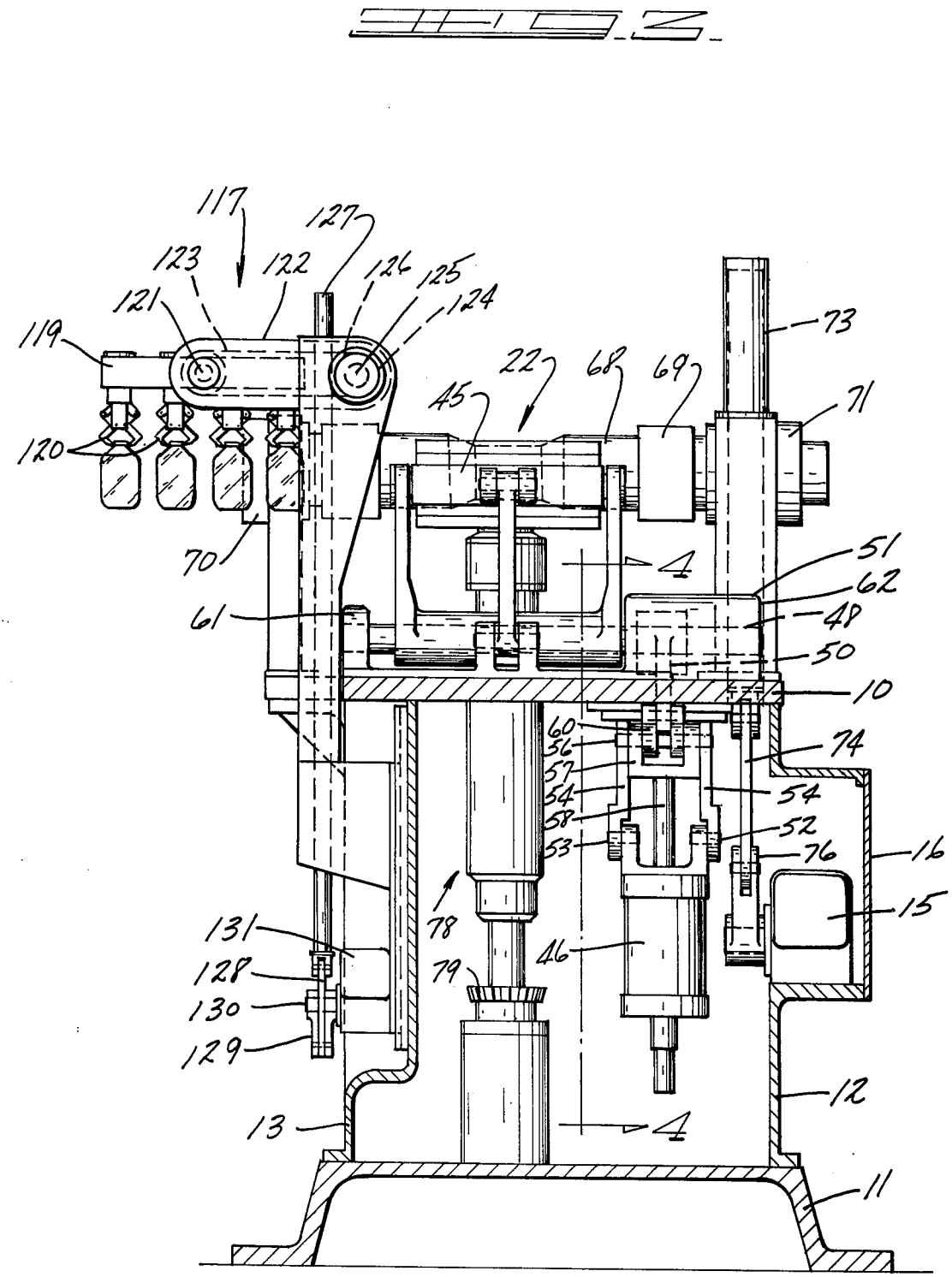
FIG. 3 is a cross-sectional view taken generally at line 3—3 of FIG. 2 with the blow head removed for clarity.

With particular reference to FIGS. 1-3, the forming machine of the invention comprises a generally horizontal table 10 which is supported at an elevated location above a base 11 by side walls 12 and 13 and end walls 14 and 15.

The side wall 12, as best seen in FIGS. 1 and 3, has a portion which extends outwardly and houses reciprocating motors 15. A cover plate 16 is removably attached to the outstanding portion of the wall 12 so as to provide access the interior of the enclosure formed by the base 11, side walls and end walls and horizontal table 10. Table 10 supports a parison forming station generally designated 17, with a vertical plane 18 defining the split line between parison mold halves 19 and 20 being centrally positioned relative to the length of the table 10 but cross-wise thereto. A pair of blow molds or final blow stations, generally designated 21 and 22, are positioned on opposite sides of and equally spaced from the parison forming station 17. Blow station 21 is comprised of a pair of blow mold halves 23 and 24 and likewise the blow station 22 is comprised of a pair of blow mold halves 25 and 26. The split line between the mold halves of both blow mold stations 21 and 22 defines vertical planes which are parallel to the vertical plane 18 defining a split line of the parison mold halves. The parison mold halves are mounted to arms 27 and 28 which extend substantially the full length of the parison molds. Intermediate their length, the arms 27 and 28 are supported by vertical pivot pins 29 and 30. The pivot pins 29 and 30 extend through bushings 31 and 32 in upper castings 33 and 34 of a "four-bar" linkage which supports the parison mold halves. The upper castings 33 and 34 extend in a horizontal plane parallel to the plane 18 of the mold halves and at their extreme ends are pivotally mounted within the upper ends of connecting links 35. The connecting links 35 extend downwardly and have a somewhat bowed configuration with their lower ends being keyed to shafts 36 and 37. The upper castings 33 and 34 also have a portion which extends outwardly at right angles with respect to the pins 29 and 30 and these portions are bifurcated. Horizontal pivot pins 38 and 39 pivotally connect the bifurcated portions of the upper castings 33 and 34 to the upper ends of connecting links 40 whose lower ends are pivotally connected to fixed anchor members 41. The anchor members 41 are mounted to the upper surface of the table 10.

As can best be seen in FIG. 2, the horizontal axes of the shafts 36 and 37 are parallel to the horizontal pivot axis of the horizontal connections of the links 40 to anchor members 41. The relative displacement of these two axes is essentially the same as the effective length of the connecting links 33 and 34 between the upper pivot pins 38 and 39 and the respective upper ends of the connecting links 35. Thus it can be seen that the links 35, upper casting 34, link 40 and the fact that the shaft 37 and anchor members 41 are fixed relative to each other constitute a "four-bar" linkage which effectively will maintain opening movement of the mold half 20 in the direction such that the face of the mold half 20 generally will be parallel to the plane 18. In the same manner, the mold half 19 is maintained with its mold face parallel with the plane 18 when moved relative to the other mold half 20. The blow mold halves 23 and 24 are likewise mounted on arms 42 and 43 with the arms 42 and 43 movable relative to each other by a "four-bar" linkage of substantially identical construction to that which supports parison mold halves 19 and 20. Similarly, the blow mold halves 25 and 26 are mounted to arms 44 and 45 and they in turn are also supported by "four-bar" linkages of substantially identical construction to that shown for supporting parison mold halves 19 and 20 and the other blow mold halves 23 and 24. In all of the configurations of the mold supporting "four-bar" linkages, the two shafts which correspond to the shafts 36 and 37 at the parison fomring station are the movement initiating forming operating members. These shafts are driven by fluid motors, one of which is shown at 46 in FIG. 3.

Figure 4:
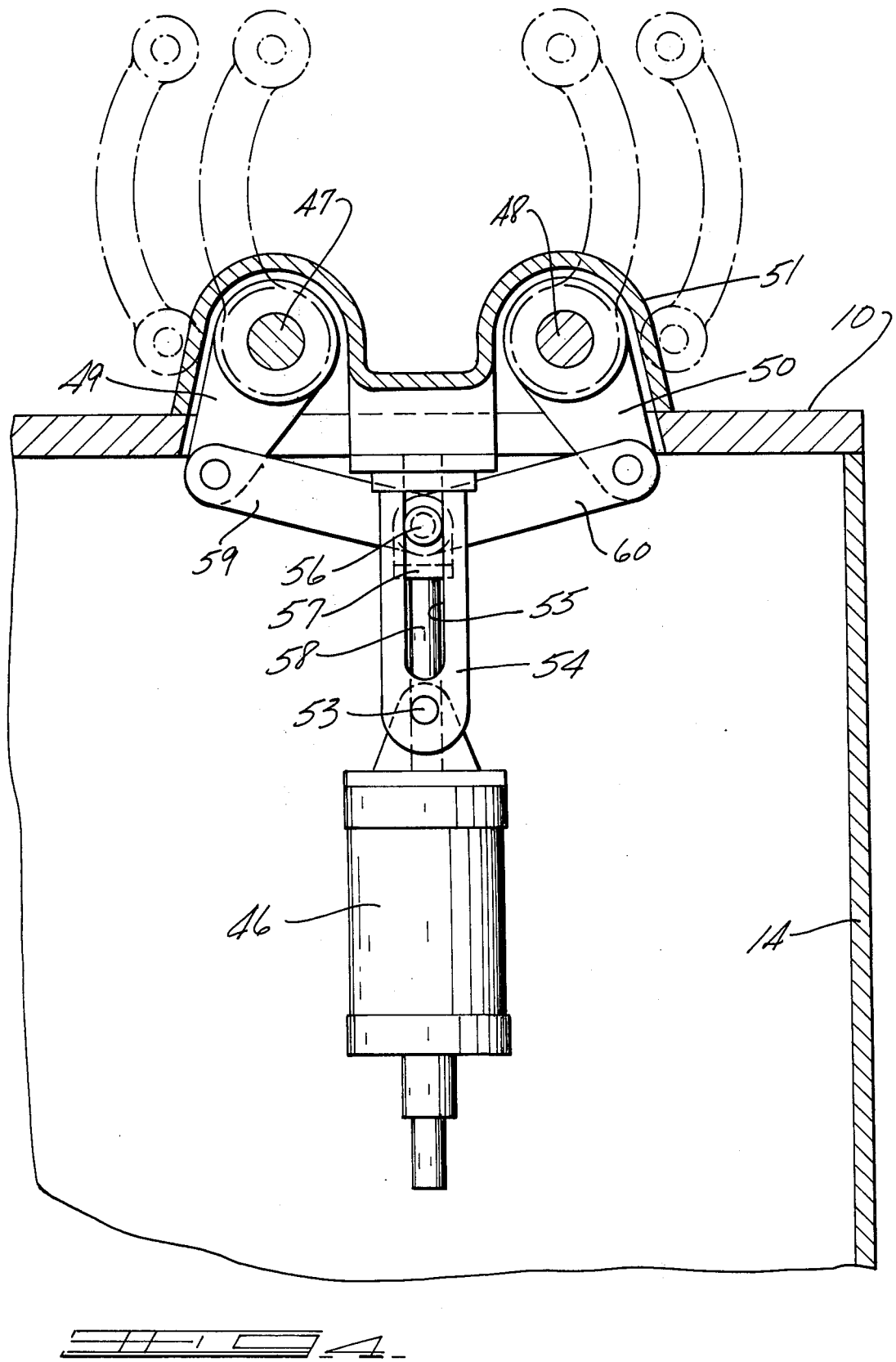
FIG. 4 is a cross-sectional view on an enlarged scale taken at line 4—4 of FIG. 3.

Inasmuch as FIG. 4 has an enlarged detailed showing of the fluid motor 46 of FIG. 3, which when operated will open and close the blow mold halves 25 and 26, it should be understood that a similar fluid motor is present for actuating the shafts 36 and 37 at the parison forming station 17 and comparable shafts associated with the blow mold station 21. The specific shafts associated with the blow mold station 22 are indicated by reference numerals 47 and 48.

With particular reference to FIGS. 3 and 4, the linkage from the fluid motor 46 to the shafts 47 and 48 will be described. Generally speaking, the shafts 47 and 48 are provided with crank arms 49 and 50. As can best be seen in FIG. 4, the crank arms extend generally downward and those portions of the shafts 47 and 48 to which the crank arms are connected are provided with a cover 51, the purpose of which is to prevent any broken glass or other material from interfering with the operation of the fluid motor. A similar cover is provided at the other stations 17 and 21. The motor 46 is pivotally mounted at its upper end by pins 52 and 53 to a downwardly extending fixed support member 54. As shown in FIG. 3, the support member 54 is comprised of two spaced-apart members, both of which are provided with vertically elongated slots 55 within which the ends of a horizontal pivot pin 56 is adapted to ride. The pivot pin 56 extends through a clevis 57 to which a piston rod 58 of the motor 46 is connected. Thus it can be seen that operation of the motor 46 will result in vertical reciprocation of the rod 58 which in turn will move the clevis 57 up and down. A pair of links 59 and 60 are connected to the pivot pin 56 at one end and to the crank arms 49 and 50 at their opposite ends. In this manner, reciprocation of the piston rod 58 results in the oscillatory, rotational motion of the shafts 47 and 48. As can readily be appreciated, rotation of the shafts 47 and 48 will result in an opening and/or closing movement with respect to the blow mold halves 25 and 26 at the blow station 22. The shaft 48, as shown in FIG. 3, has its end supported in bearings 61 and 62. In a similar manner, the other mold supporting mechanisms and their actuation are essentially the same as that described in detail with regard to station 22 shown in FIGS. 3 and 4.

In the particular arrangement and position of the apparatus shown in FIGS. 1 and 2, two neck rings or finish mold supporting mechanisms, generally designated 63, are shown, one being positioned at the parison forming station 17 and the other being positioned at the blow mold station 21. These neck ring supporting mechanisms provide the means for transferring and inverting formed parisons from the parison molds to the blow molds. Neck ring supporting units include a plurality of split neck rings or molds 64 (see FIGS. 5 and 6) and centrally positioned plungers 65. Each individual neck mold has a plunger carried coaxially therewith, it being understood that in the mechanism shown on the drawings, four neck rings and plunger units are carried by each invert mechanism. Furthermore, as will be later explained in more detail when considering FIGS. 5 and 6, the neck ring supporting mechanism 63 is mounted to or carried by a pair of spaced-apart invert arms 66 and 67. The invert arms 66 and 67 are detachably connected to a horizontal spindle 68 by a mounting bracket 69. The spindle 68 is provided with end bearings 70 and 71. Adjacent the end bearing 71, the spindle 68 carries a pinion 72. The pinion 72 is in mesh with a vertically extending rack 73 and through reciprocation of the rack 73 the arms 66 and 67 will effect the transfer of the parisons by their necks from the parison forming station 17 to blow station 22. Operating in a like manner, will be the neck ring support mechanism 63' at the blow station 21 and as shown in FIGS. 1 and 2, is in the position where the transfer of the parison has been completed.

The transfer arms, for purposes of simplification, are designated with the same reference numerals as those applied to the set of transfer arms 66 and 67 which are in position at the parison station but are primed. As can be seen in viewing FIG. 2, the left-hand spindle 68' carries a pinion 72' to which a rack 73' is in engagement and will effect the revert motion of the neck ring or mold support mechanism 63'. Operation of the racks 73 and 73' is through linkages 74 and 74'. The motors 15 and 15', which are of the double acting or reciprocating fluid type, drive output shafts 75 and 75'. The output shafts 75 and 75' are connected to cranks 76 and 76' which in turn are pivotally connected to the lower ends of linkages 74 and 74'. As shown in FIG. 2, the crank 76 extends upwardly and the position of the rack 73 is at its uppermost position. The rack 73' is in its lowermost position and the crank 76' is extending vertically downward, it being understood that the motor 15', associated with the output shaft 75', will move the crank 76 in a clockwise direction to effectively revert the invert arm 66' from the blow mold station 21 to the parison mold station 17.

At the blow stations 21 and 22 there are provided bottom plate support members 77 and 78. As will be appreciated, the apparatus is capable of forming containers of various heights and sizes, thus the blow molds will be changed depending upon the configuration of the finished ware that is to be produced. With this in mind, it is necessary that the bottom plate for the blow mold, which remains in position at the blow station, be capable of vertical adjustability. It should also be understood that the bottom plate is an item that may be replaced on its support by bottom plates of other sizes. The support members 77 and 78 are of a generally conventional configuration and are of a style where the height of the support mechanism may be adjusted by rotation of beveled gears 79 and 80 in a conventional manner, as taught in the prior art. Beveled gears 79 and 80 normally will have cooperative beveled gears, not shown, which are hand-operable since this adjustment is made at the time of the initial set-up of the machine. It is not something which varies during the operation of the machine in making ware.

Figure 5:
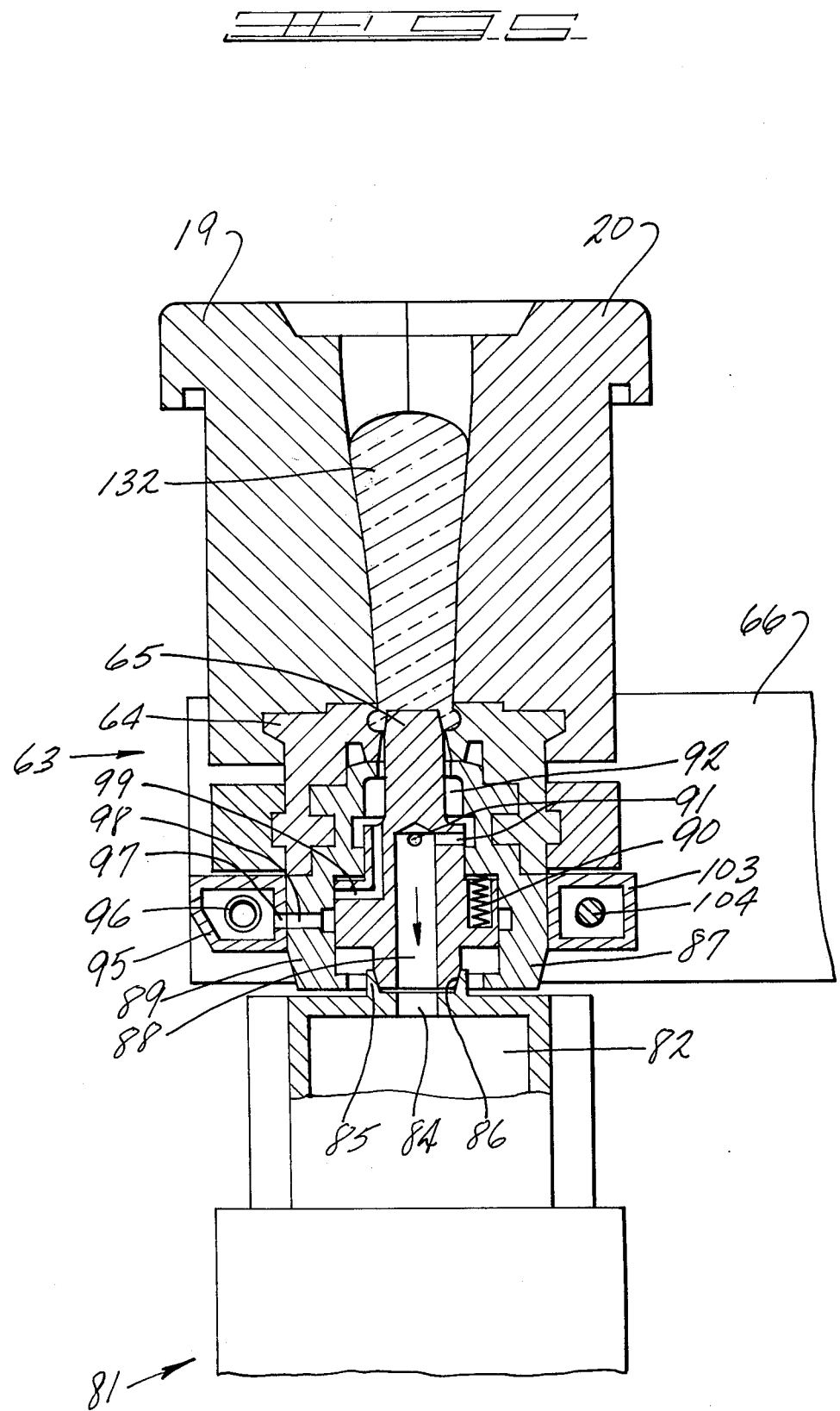
FIG. 5 is a cross-sectional view on an enlarged scale taken at line 5—5 of FIG. 1 showing the neck mold and transfer mechanism in detail.
Figure 6:
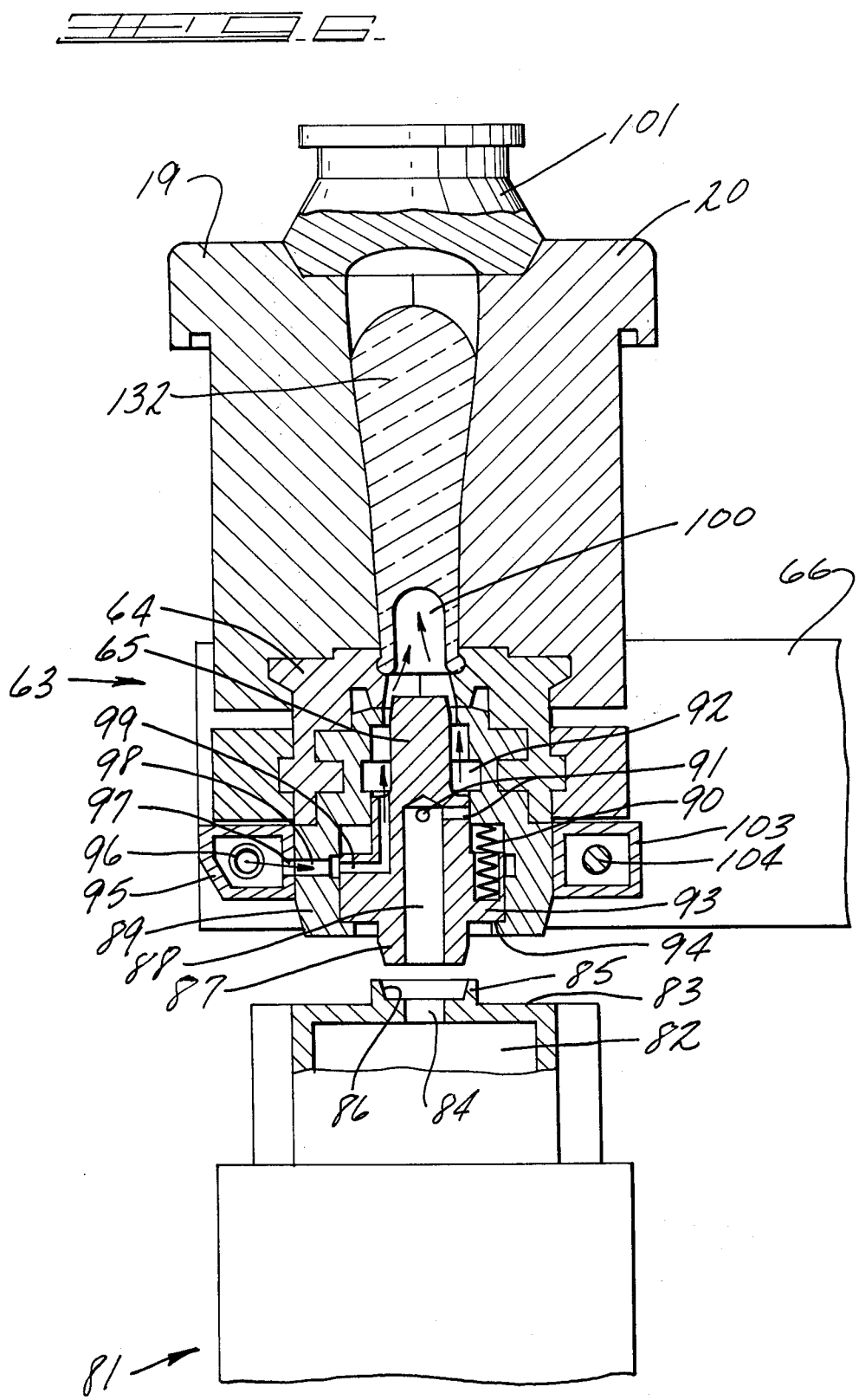
FIG. 6 is a cross-sectional view, similar to FIG. 5, showing the plunger or neck pin in retracted position.

At the parison forming station 17 there is shown a similar support member 81. The upper end of the member 81 is provided with a vacuum chamber 82. As best shown in FIGS. 5 and 6, the vacuum chamber 82 has a top wall 83 with an opening 84 formed therein. It should be pointed out that the vacuum chamber 82 extends the full span of the plurality of mold cavities that are present at the parison forming station and there will be an opening 84 associated with each parison mold cavity. Above the opening 84, an upwardly extending annular member 85 is provided, with the member 85 having a downwardly and inwardly beveled inner wall 86. The member 85, with its tapered wall 86 is adapted to cooperatively engage or be engaged by a lower annular, tapered end 87 of plunger 65. The actual upper positioning of the chamber 82 is critical and must cooperatively engage with the end 87 of the plunger during the initial portion of the parison forming cycle. When the invert arms 66 and 67 are moved into the position shown in FIGS. 1 and 2, the top wall 83 of vacuum chamber 82 will be at the position specifically illustrated in FIGS. 2 and 5, at which time the end 87 of the plunger 65 will engage annular member 85 on the top wall 83 of the chamber 82. The plunger 65 has a vertical passageway 88 extending from the lower end to a position approximately half the length thereof. The plunger 65 is vertically positionable within a plunger guide 89. A compression spring 90 biases the plunger 65 in a downward direction relative to the plunger guide 89. When, in the position shown in FIG. 5, the plunger is engaged with the annular member 85, the plunger will be in its uppermost position, at which time the passageway 88 will be in communication with vacuum in the vacuum chamber 82. The vacuum in passageway 88, through side ports 91, communicates with an annular chamber 92 within the plunger guide 89. Chamber 92 effectively provides for vacuum about the upper end of the plunger 65 in the neck ring area to provide a vacuum settle of the gob of molten glass around the tip of the plunger 65 and within the confines of the neck ring or mold 64.

In the cycle for forming the parison after vacuum settle has been completed, the vacuum chamber 82 is lowered to the position shown in FIG. 6. At this time, vacuum may be discontinued in its supply to the chamber 82. The plunger 65, under the influence of the compression spring 90, will move downwardly with a lower shoulder 93 engaging an inwardly extending annular shoulder 94 at the lower end of the plunger guide 89. The plunger guide 89 supports an air manifold 95 which extends along essentially the full length of the plunger guide 89. A source of air under pressure is supplied to the manifold 95 through a pipe 96. The manifold 95 has a series of openings 97 that communicate with individual passageways 98 in plunger guide 89. The passageway 98, as shown in FIG. 6, extends through and is in communication with the chamber within guide 89 in which the plunger guiding function takes place. A passageway 99 in the plunger 65 will come into alignment with passageway 98 when the plunger is in its fully retracted position, as illustrated in FIG. 6, at which time air under relatively low pressure will enter the passageway 99 and enter the annular chamber 92, flow past the tip of the plunger 65 and begin to expand molten glass by forming a bubble 100 which is gradually expanded until the molten glass touches all the walls of the mold halves 19 and 20 and a bottom closing baffle 101. As the plunger moves to the position shown in FIG. 6, the vacuum ports 91 are covered to effectively seal the guide chamber 92 from leakage through the passage 88.

As shown in FIG. 2, the baffle 101 is carried by a support 102 which will effectively carry, in the present case, four individual baffles. The mechanism for mounting and moving the baffle support 102 is not shown, it being understood that baffles 101 must be positioned out of alignment with the mold cavities at the time the cavity is being loaded with a gob of molten glass and also the baffles must be positioned such that they do not interfere with the transfer of the formed parisons from the parison station to the blow mold stations.

The plunger guide 89 also carries an elongated cover 103 in generally opposing relationship with respect to the manifold 95. The cover 103 encloses a shaft 104. The shaft 104 is the neck mold opening and closing mechanism drive shaft, details of which are not shown. The shaft 104 extends between and through the arms 66 and 67. The shaft will actuate a mechanism within the arms 66 and 67 for spreading the neck molds to release the neck of the parisons at the blow mold station. The shaft 104 at one end carries a crank arm 105 to which a link 106 is pivotally attached. The link 106 is connected to an output shaft 107 of a fluid motor 108, with the motor 108 being mounted to a bracket 109 fixed to the side of the arm 66. Actuation of the motor 108 will result in rotation of the shaft 104, it being understood that rotation of the shaft 104 will effectively open or close the neck molds or neck rings in a pre-selected sequence dictated by the forming cycle.

After the parisons are transferred from the parison forming station 17 to either of the blow mold stations 21 or 22, the neck molds or rings are opened, releasing the parison so that it may reheat and run under the influence of gravity while being suspended by the finish or the neck portion. Then blowheads, designated 110 and 110', will move into overlying relationship to the upper neck of the parisons to apply air under pressure to the interior of the parison to expand it into its final shape determined by the shape of the cavity in the blow mold. The blowheads 110 and 110' are shown in their "parked" position for convenience, it being understood that operation of a vertically positioned motor 111 or 111' will drive a rack 112 or 112' in mesh with a pinion 113 or 113' to drive a "four-bar" linkage 114 or 114' to which the blowheads 110 or 110' are mounted by a support rack 115 or 115'. After the bottles have been fully formed, the molds, for example at blow station 22, will be moved apart leaving the blown containers sitting on bottom plates 116, at which time take-out mechanisms generally designated 117 will be operated to take the formed bottles from the bottom plates 116 to a position which is clear of the forming machine where the ware is then placed on a cooling dead plate 118 (see FIG. 20). The take-out mechanism 117 consists of an elongated head 119 which carries a plurality of, in this case four, tongs 120 which effectively grip the blown containers by their necks beneath the finish. The head 119 is supported intermediate its length by a pivot shaft 121 which extends through a transfer arm 122. The shaft 121, within the confines of the transfer arm 122 which in actual practice is a hollow housing, carries a sprocket. This sprocket supports a chain 123 which extends around a second sprocket 124 carried by a pivot shaft 125. The shaft 125 is driven by a pinion 126 which is in mesh with a vertically reciprocable rack 127. The rack 127 is connected at its lower end to a link 128, with the lower end of the link being connected to a crank 129 carried by a drive shaft 130. The shaft 130 is the output shaft of a reciprocatory fluid motor 131, of substantially the same general configuration as motors 15 or 15'. Thus it can be seen that reciprocation of the rack 127 will move the ware from the blow station 22 to the position shown in FIG. 3 while maintaining the ware in an upright attitude. The tongs are opened and closed in a conventional manner and will receive signals from the overall timing system of the forming machine.

The foregoing description sets forth in detail the mechanisms which are present in the forming machine of the invention.

With reference to FIGS. 7–21, the forming cycle or process carried out by the apparatus will be described in order to provide better insight into the operation of the apparatus. FIG. 7 shows the beginning point in the cycle when the parison mold halves 19 and 20 are closed about the neck molds or neck rings 64 and the neck ring support mechanism 63 is in the parison forming position. The vacuum chamber support member 81 is in elevated position with the vacuum chamber 82 communicating with the interior passage 88 in the plunger 65. At this point in the forming cycle, a gob 132 of molten glass is about to enter the open upper end of the parison mold. In FIG. 8, the gob has entered the mold and the vacuum 82 has settled the gob 132 about the raised plunger or neck pin 65. FIG. 9 illustrates the next sequence of events and is similar to FIG. 6, wherein the support member 81 is lowered thus permitting the plunger 65 to retract under the influence of the spring 90, with air within the manifold chamber 95 beginning to expand the gob 132 by forming the bubble of air 100 therein. At this point in time, the baffle 101 is seated to close the open upper end of the parison mold. Turning now to FIG. 10, the bubble 100 has increased in size due to the air under pressure from the manifold 95 which, it must be remembered, is relatively low in pressure compared with the pressures that have been used in the past to develop the parison or, as termed in the art, "counterblowing the parison." This low pressure air in the manifold 95 is continued until the parison is fully formed, as shown in FIG. 11. When the parison is completely formed, the baffle 101 is raised to the position shown in FIG. 12 and the parison mold halves 19 and 20 are opened, with the completed parison, designated 133, extending generally vertically with respect to the neck rings 64. Air under pressure from the manifold 95 is maintained above atmospheric within the interior of the parison 133 to help support the parison. The neck rings 64, as previously stated, are supported by the mechanism generally designated 63 which in turn is supported by the invert arm 66. It should be understood that there is another invert arm 67, as shown in FIG. 1, associated with the supports 63. As shown in FIG. 13, the invert arm 66 will swing about the horizontal axis of the spindle 68 to transfer the parisons to the blow molding station 22. In FIG. 14, the parison is in its midpoint in the invert transfer from the parison station 17 to the blow molding station 22. Here again the low pressure air is maintained within the interior 100 of the parison 133. As a matter of fact, it is possible to continue slight expansion of the parison during the invert operation which takes place in the sequence of FIGS. 13, 14 and 15 if it is determined to be desirable to effect the proper configuration of the parison and the temperature thereof.

After the parison has arrived at the blow molding station 22 illustrated in FIG. 15, the parison will have its outer skin reheated due to the temperature of the glass within the interior of the parison and the air under soft pressure will have been discontinued at this point in time and the parison will sag from its own weight under the influence of gravity. The blow mold halves 25 and 26 are closed relative to the parison and the bottom plate 116, assuming the position illustrated in FIG. 16. The neck rings are opened and the parison is released so as to be suspended by its neck from the upper surface of the blow mold halves 25 and 26 at the blow station 22. This is specifically illustrated in FIG. 16. The invert arm 66 is reverted to the parison station 17. While the parison 133 continues to run and reheat, a blowhead 110 is brought into overlying relationship with respect to the blow mold halves 25 and 26 and air under pressure introduced through the blowhead 110 will expand the parison to the final bottle shape, as shown in FIG. 17. The blowhead 110 will then be moved upward and away from the blow molding station 22 at which time, as illustrated in FIG. 19, the mold halves 25 and 26 are moved apart leaving the blown container resting on the bottom plate 116. The neck-grasping tongs 120 engage the finish of the container and move the container from the bottom plate 116 to the upper surface or cooling dead plate 118, see FIG. 20, through which air passes to set-up the bottom of the container and cool it sufficiently to permit it to be handled through the annealing process. The tongs 120 will open, releasing the bottle to the cooling dead plate 118. In the proper sequence of events, the container sitting on the dead plate 118 will be moved by a pusher bar 134 which pushes the container from the dead plate onto the upper surface of a conveyor generally designated 135 in FIG. 21. This completes one full cycle in the formation of a container from the time the gob is fed to the parison mold until such time as a completely formed glass container or bottle is moved to a conveyor which will carry the container away from the forming machine area to a position where it will be transferred to an annealing lehr.

As can be seen from the foregoing, the apparatus for carrying out the process set forth herein and as generally illustrated in FIGS. 7–21, the counterblowing of the parison may take place sooner than in those situations in the prior art where the parison is settled around the neck pin or plunger by application of air under pressure above the gob, due to the fact that by using vacuum the parison is settled more quickly. The counterblow, being soft, extends the time in which the parison is being counterblown. The term "soft" being synonymous with low pressure. The early application of the soft counterblow has the benefits of permitting a hotter glass gob temperature and by having the neck ring invert or transfer unit in which a positive internal pressure is maintained within the parison to prevent collapse during the invert, assures a more uniformly distributed radial glass wall dimension. A longer controlled reheat also contributes to the end result of a container which has very uniform glass wall distribution. This improved distribution permits a substantial reduction in glass weight without any loss of container strength.

We claim:

1. Apparatus for forming lightweight glass containers by the blow and blow process wherein a plurality of charges of glass at an elevated temperature are delivered to a plurality of parison forming mold cavities with aligned neck molds and a vacuum is applied to the neck molds to settle the charges therein, the improvement comprising:

a source of low pressure air;

a neck mold supporting arm;

means for immediately delivering counterblow air under low pressure in the range of 1-10 psi to the interior of the neck molds for a time sufficient to cause the charges of glass to just expand into the full shape of the parison cavities;

means connected to the neck mold supporting arm for inverting and transferring the parisons carried thereby from the parison molds to blow molds;

said neck mold supporting and transferring means including:
(a) means for maintaining air within the interior of the formed parisons at sufficient level of pressure therein to assist in supporting the parisons during transfer; and
(b) means for opening the neck molds to release the parisons at the blow mold station wherein the parisons are expanded to final shape.

2. The apparatus of claim 1 wherein said means for maintaining air under pressure within the parison during transfer comprises neck mold supporting means and valve means in the neck mold supporting means for entrapping the air within the parison.

3. The apparatus of claim 1, further including means connected to the neck mold invert and transfer means for delivering air under pressure to the interior of the parisons during the transfer of the parisons to the blow station.

4. Apparatus for forming plural glass articles simultaneously comprising:

a multi-cavity parison mold, said parison mold being formed of a plurality of aligned split molds with the split line for all of the parison mold halves defining a first vertical plane;

a pair of plural cavity blow molds, positioned on opposite sides of said parison mold;

said blow molds being formed of a plurality of aligned, split molds with the split lines thereof defining second and third vertical planes, parallel to said first vertical plane;

a first pair of transfer arms pivotally supported for swinging movement in concert about a horizontal axis intermediate the parison mold and one of the blow molds;

a second pair of transfer arms pivotally supported for swinging movement in concert about a horizontal axis intermediate the parison mold and the other blow mold;

plural, partible neck rings carried by and between each pair of transfer arms for swinging movement from beneath and in registry with the parison mold to registration with the top of the blow mold, said transfer arms of each pair being spaced from each other an amount sufficient to provide clearance past each end of the parison molds;

a source of air under pressure;

means mounted on each said neck mold carrying transfer arm and connected to said source of air under pressure for maintaining air under pressure within the interior of formed parisons during transfer from the parison molds to the blow molds.

5. The apparatus of claim 4 further including means connected to said neck rings for opening and closing all of said neck rings simultaneously.

6. The apparatus of claim 5 wherein said neck ring opening and closing means comprises a rotatable shaft extending between said transfer arms, motor means carried by one arm and connected to said shaft for rotating said shaft.

7. The apparatus of claim 4 further including elongated mold hangers for supporting the mold halves in closed, facing relationship, and means connected to said mold hangers for moving said hangers and mold halves relative to each other while maintaining the faces of the mold halves in a plane parallel to the plane of the parting line.

8. The apparatus of claim 7 wherein said means for moving said hangers comprises a four-bar linkage connected to each mold hanger, a horizontal shaft at one corner of each of said linkages, and means for oscillating said shaft about its horizontal axis for opening and closing said mold halves.

9. The apparatus of claim 8 further comprising crank arms connected to said horizontal shaft, a pair of links pivotally connected to said crank arms at one end thereof and means pivotally connecting said links together at their other ends, and means for linearly reciprocating the connected ends of said links whereby the crank arms are oscillated through equal but opposite angles.

10. The apparatus of claim 4 further including a pair of elongated mold hangers for supporting the parison mold halves in closed, facing relationship, and means connected to said mold hangers for moving said hangers and mold halves relative to each other while maintaining the faces of the mold halves in a plane parallel to the plane of the parting line.

11. The apparatus of claim 10 wherein said means for moving said hangers comprises a four-bar linkage connected to each mold hanger, a horizontal shaft at one corner of each of said linkages, and means for oscillating said shaft about its horizontal axis for opening and closing said mold halves.

12. The apparatus of claim 11 further comprising crank arms connected to said horizontal shaft, a pair of links pivotally connected to said crank arms at one end thereof and means pivotally connecting said links together at their other ends, and means for linearly reciprocating the connected ends of said links whereby the crank arms are oscillated through equal but opposite angles.

13. The apparatus of claim 11 further including elongated mold hangers for supporting the blow mold halves in closed, facing relationship, and means connected to said mold hangers for moving said hangers and mold halves relative to each other while maintaining the faces of the mold halves in a plane parallel to the plane of the parting line.

14. The apparatus of claim 13 wherein said means for moving said hangers comprises a four-bar linkage connected to each mold hanger, a horizontal shaft at one corner of each of said linkages, and means for oscillating said shaft about its horizontal axis for opening and closing said mold halves.

15. The apparatus of claim 13 further comprising crank arms connected to said horizontal shaft, a pair of links pivotally connected to said crank arms at one end thereof and means pivotally connecting said links together at their other ends, and means for linearly reciprocating the connected ends of said links whereby the crank arms are oscillated through equal but opposite angles.

* * * * *